United States Patent [19]

Wanner

[11] 4,194,889
[45] Mar. 25, 1980

[54] METHOD OF AND APPARATUS FOR PROCESSING SULFUR-CONTAINING EXHAUST GAS

[75] Inventor: Dieter Wanner, Liederbach, Fed. Rep. of Germany

[73] Assignee: Metallgesellschaft Aktiengesellschaft, Frankfurt am Main, Fed. Rep. of Germany

[21] Appl. No.: 884,803

[22] Filed: Mar. 9, 1978

[30] Foreign Application Priority Data

Mar. 11, 1977 [DE] Fed. Rep. of Germany ....... 2710627

[51] Int. Cl.² .................. B03C 3/01; B03C 3/16; B01D 47/00
[52] U.S. Cl. .............................. 55/7; 55/10; 55/11; 55/71; 55/73; 55/89; 55/122; 55/124; 55/135; 55/228; 55/222; 55/257 HE; 55/258; 55/267; 423/215.5; 423/531; 423/542
[58] Field of Search ................... 55/4, 7-11, 55/73, 89, 122, 124, 126, 134, 135, 222, 228, 257 R, 258, 267, 71, 257 HE; 423/215.5, 522, 531, 532, 540, 542; 23/261

[56] References Cited

U.S. PATENT DOCUMENTS

| | | | |
|---|---|---|---|
| 1,387,857 | 8/1921 | McKee | 55/73 |
| 1,405,669 | 2/1922 | Chase et al. | 423/531 |
| 2,028,318 | 1/1936 | Carter | 423/215.5 |
| 2,357,195 | 8/1944 | Herrmann | 23/261 |
| 2,471,072 | 5/1949 | Merriam | 423/522 |
| 3,444,668 | 5/1969 | Masuda | 55/228 |
| 3,782,451 | 1/1974 | Cates | 261/DIG. 77 |
| 3,899,308 | 8/1975 | Peterson | 55/8 |
| 3,950,493 | 4/1976 | Dorr et al. | 55/73 |
| 4,023,938 | 5/1977 | Guth et al. | 55/73 |

FOREIGN PATENT DOCUMENTS

| | | | |
|---|---|---|---|
| 6405596 | 11/1964 | Netherlands | 423/522 |
| 361265 | 11/1931 | United Kingdom | 55/7 |
| 1215766 | 12/1970 | United Kingdom | 55/228 |

*Primary Examiner*—David L. Lacey
*Attorney, Agent, or Firm*—Karl F. Ross

[57] ABSTRACT

The sulfur-containing roasting gases of an ore-roasting plant are cooled in a waste-heat boiler, which produces steam, and then are subjected to particle removal in an electrostatic precipitator or cyclone. The gases are then scrubbed with recirculated aqueous sulfur acid and the gas is then passed through an electrostatic precipitator before being supplied to a plant for the contact process production of sulfur acid. According to the invention, the process is improved by condensing water from the gas in an indirect cooler between the scrubber and the final electrostatic precipitator while water or aqueous sulfur acid is sprayed into the gas upstream of the indirect gas cooler to augment the heat transfer from the gas to the cooled wall thereof.

15 Claims, 3 Drawing Figures

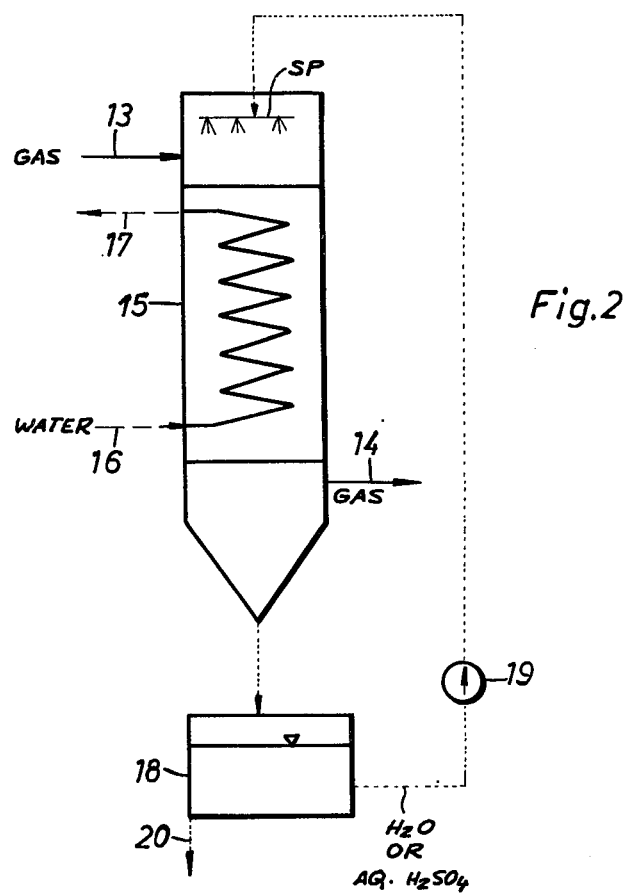

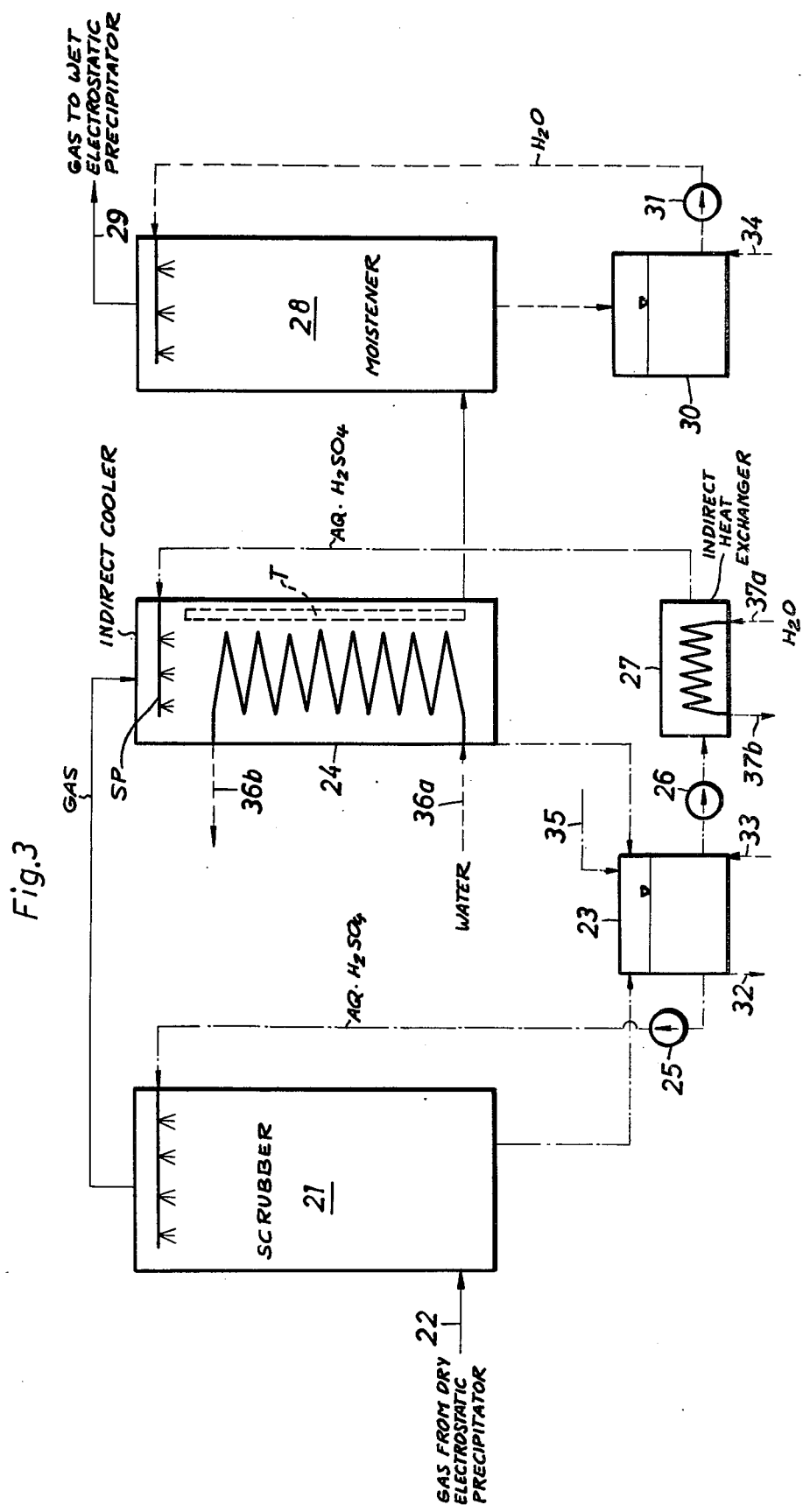

METHOD OF AND APPARATUS FOR PROCESSING SULFUR-CONTAINING EXHAUST GAS

FIELD OF THE INVENTION

This invention relates to a method of and to an apparatus for processing sulfur-containing exhaust gas as can be obtained from roasting furnaces or the like and, more particularly to a method and apparatus for preparing a gas for use in the production of sulfuric acid in a contact-process plant.

BACKGROUND OF THE INVENTION

In the processing of sulfur-containing exhaust gas intended for use in the recovery of sulfuric acid in contact process plants, it is conventional to extract sensible heat from such gas in a waste-heat boiler. That heat can be utilized as useful heat elsewhere, e.g. by producing steam for heating in the plant. Entrained dust must also be removed from the exhaust gas so that equipment downstream will not be clogged or rendered less effective by deposited dust.

This cleaning is usually effected at a temperature of 200°–400° C., generally in an electrostatic precipitator and/or a cyclone.

The exhaust gas is then passed through a scrubber for removal of constituents which are gaseous during the dry cleaning step but condense at lower temperatures. Such constituents are, e.g. $H_2SO_4$ mist, arsenic oxide etc.

In the scrubber, the gas is usually sprayed with circulated scrubbing acid ($H_2O+H_2SO_4$) and is thus adiabatically cooled to the dewpoint temperature of 60° to 80° C., depending on the $H_2SO_4$ concentration of the scrubbing acid. The exhaust gas absorbs water as it is scrubbed and, upon leaving the scrubber, contains 200–400 g water per $m^3$ (STP). As this water content is too high for the production of concentrated sulfuric acid, the exhaust gas must be cooled to a temperature of about 40° C. and must be adjusted to a water content of about 60 g per $m^3$ (STP).

Shell-and-tube heat exchangers, inter alia, are used for this cooling of the exhaust gas and must be made from carbon or lead in order to avoid corrosion. The shell-and-tube heat exchangers are usually installed in an upright position and the exhaust gas flows through the tubes from top to bottom. The cooling tubes may be provided with fins on the inside, in order to increase the heat transfer, and are contacted by flowing cooling water on the outside.

Because the temperature differences which are available are very small, such shell-and-tube heat exchangers must have a very large heat-exchange surface area and for this reason and owing to the special materials used to avoid corrosion are comparatively expensive. The higher the temperature of the cooling water which is available, the larger must be the heat-exchange surface area. Because the exhaust gas is at a given temperature, say 40° C., very large and expensive gas coolers are required when the cooling water inlet temperature is as high as 25° C.

OBJECTS OF THE INVENTION

It is the principal object of the present invention to provide a method of treating sulfur-containing gases and, more particularly, the waste gases of an ore-roasting plant so as to enable these gases to be used in a contact process for the production of sulfuric acid.

Another object of the invention is to provide a method of improving upon the standard process for the treatment of roasting gases so as to eliminate the need for expensive and large indirect gas coolers between the scrubbing tower and the electrostatic precipitator.

Yet another object is to improve upon the economies of the gas-treatment process, especially by reducing the energy and capital cost of the indirect cooling of the exhaust gas without causing other disadvantages to arise.

It is also an object of this invention to provide a method for the purposes described which can be used effectively with cooling water at a relatively high temperature while maintaining an exhaust gas temperature at the inlet to the final electrostatic precipitator of about 40° C.

Another object is to provide an improved apparatus for the treatment of sulfur containing gases.

SUMMARY OF THE INVENTION

These objects and others which will become apparent hereinafter are attained, in accordance with the present invention, in a system of the type described wherein, between the scrubbing tower using the aqueous sulfuric acid and the wet-process electrostatic precipitator, there is provided an indirect cooler with enhanced cooling efficiency by spraying water or aqueous sulfuric acid into the gas space at the upstream end of this unit. The invention, as will be apparent in greater detail hereinafter, derives from my surprising discovery that, in spite of the fact that a practically saturated gas is treated in the indirect cooler, the heat exchange efficiency within the latter between the gas and the indirectly cooled wall of this cooler can be improved by spraying additional water into the gas just before it enters the cooling tubes. Phrased otherwise, the invention resides in providing, apart from any condensate formed by the cooling gas in the indirect cooler, a liquid phase at least in contact with the cooled wall or as droplets in the gas to increase the heat transfer at the gas/wall boundary region.

Consequently, while one ordinarily would not believe that the introduction of water into the saturated gas can have any effect ahead of the indirect cooling surfaces of the indirect cooler and indeed might even be contradictory to the desire to reduce the water content in the latter unit, the introduction of water as a spray at the upstream end of this indirect cooling tower, sharply increases the cooling efficiency so that a smaller heat exchange surface (at lower cost) can be used or the temperature of the cooling water on the opposite side of these cooling surfaces can be somewhat higher for a given final temperature of the gas.

Thus, in the invention, the exhaust gas which has been subjected to the dust-collecting dry-process treatment is sprayed in the scrubber with scrubbing acid ($H_2O+H_2SO_4$) in known manner and is thus adiabatically cooled to the dewpoint of the scrubbing acid and caused to absorb water, and in addition and as a critical aspect of the invention, the gas is also sprayed with liquid in the indirect gas cooler.

It has been found, as noted above, that the heat transfer on the gas side of the indirect gas cooler can be very considerably increased. This improvement can be explained as follows:

Part of the sprayed liquid falls freely in the cooler and forms an additional surface on which water vapor can condense. When the sprayed liquid has fallen through a certain vertical distance, the sprayed liquid and the condensed water vapor reach the inside surface of the cooling tubes and deliver the absorbed heat of condensation to the previously cooled film of condensate and increase the thickness of the liquid film so that the latter flows down faster and with increased turbulence. As a result, the heat transfer to the wall of the cooling tube and to the cooling water is improved.

Water and/or condensate which becomes available in the gas cooler is thus sprayed into the upstream end of the indirect gas cooler.

A further improvement in the overall efficiency can be effected when the same scrubbing acid is sprayed in the indirect gas cooler as in the scrubber.

This further improvement can be explained as follows:

When the exhaust gas is adiabatically cooled in the scrubber, the enthalpy at the inlet is, by definition, equal to the enthalpy at the outlet. Because the $H_2O$ partial pressure depends on the concentration of the scrubbing acid, the exhaust gas temperature at the outlet will increase, if the enthalpy is the same, as the acid concentration increases and, in accordance therewith, as the $H_2O$ partial pressure decreases.

Because the acid concentration in the scrubber is generally much higher than the acid concentration of the condensate which becomes available in the indirect gas cooler, the exhaust gas temperature at the top of the indirect gas cooler decreases as a result of the mixing of the exhaust gas with the sprayed condensate from the cooler. At the same time, the exhaust gas absorbs water, until it is saturated therewith, from the sprayed condensate which has been formed in the cooler.

Because this phenomenon is very fast, it is essentially completed when the exhaust gas enters the cooling tubes. Since the exhaust gas enters the gas cooler at a lower temperature, a lower total temperature difference is available for the heat transfer to the cooling water. Besides, because the gas is saturated with water, more water must be condensed at the top of the gas cooler than in a non-spraying process.

The heat transfer is also improved by the turbulence which is due to the spraying of condensate from the cooler. However, this improvement is effective only in part, for the reasons stated above, so that the expenditure for the indirect gas cooling is not decreased as much as is desired, particularly when the cooling water is at a high temperature.

On the other hand, if the exhaust gas at the top of the gas cooler is sprayed with scrubbing acid which has substantially the same concentration as the scrubbing acid in the scrubber, the state of the exhaust gas will not be changed at the top of the gas cooler. Additional water will not be absorbed and the temperature of the exhaust gas will not be decreased. As a result, a higher mean temperature difference will be available for cooling the exhaust gas and for decreasing its water content by condensation, so that a smaller heat exchange surface area will be sufficient for a dissipation of heat at a certain rate. Besides, the falling droplets of scrubbing acid provide an additional surface for condensation, compared to a process in which there is no spraying at all, and the heat transfer conditions in the condensate film which has formed on the cooling tubes are also improved. As a result, an even smaller heat exchange area is required.

When the method is carried out in the preferred mode, the water vapor content of the exhaust gas leaving the indirect gas cooler can be decreased to values which are lower than those required for an optimum separation in the following wet-process electrostatic precipitator. As a result, a moistening tower can be interposed between the indirect gas cooler and the wet-process electrostatic precipitator and may be used for spraying the exhaust gas with water so that the exhaust gas is exactly adjusted to the condition required for the wet-process electrostatic precipitator and is simultaneously brought to the desired final temperature.

According to another feature of the invention the scrubbing acid for the scrubber and the indirect gas cooler is recirculated through a common reservoir, which may also be fed with the condensate that become available in the wet-process electrostatic precipitator. The reservoir may also be used for a control of the acid concentration at a predetermined value by a removal of scrubbing acid and a supply of water. The acid concentration in the reservoir is controlled at a value of 20–70%, preferably 45–65%. With that control, an indirect gas cooler having predetermined overall dimensions can be adapted to pregiven cooling water temperatures, and variations in the cooling water temperature can be compensated.

The exhaust gas is passed through the gas cooler preferably through the vertical cooling tubes codirectionally with the sprayed liquid. The cooling tubes can be provided with internal fins and are contacted on the outside by cooling water flowing in a countercurrent to the exhaust gas.

If the scrubbing acid sprayed into the gas stream in the indirect gas cooler is cooled in an indirect heat exchanger, the temperature difference between the gas and the condensate film can be further increased so that a further improvement is obtained.

The water for the moistening tower is usually also recirculated through a reservoir. Another advantage afforded by the process according to the invention is that hydrogen halides are removed from the exhaust gas in the moistening tower. The hydrigen halides are removed from the reservoir and make-up water is added to the reservoir.

BRIEF DESCRIPTION OF THE DRAWING

FIG. 2 is a diagrammatic view showing a portion of a plant in accordance with the invention, in which condensate from the indirect gas cooler is sprayed in the latter; and FIG. 3 shows a portion of a plant in accordance with the invention in which scrubbing acid is sprayed in the indirect gas cooler.

SPECIFIC DESCRIPTION

Figure 1:
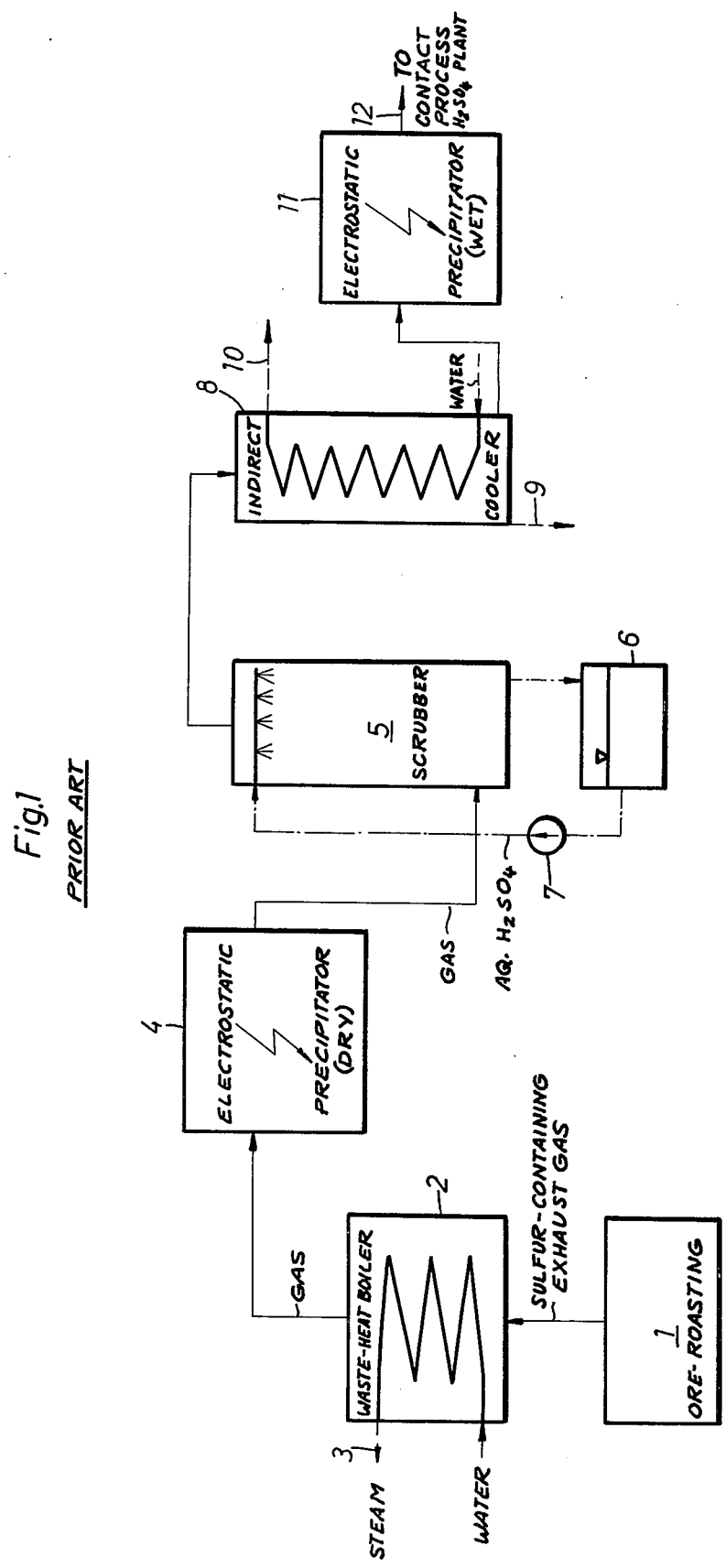
FIG. 1 is a diagrammatic view showing a conventional plant which is intended to be improved in accordance with the present invention.

In accordance with the prior art, shown in FIG. 1, sulfur-containing exhaust gas which has become available in a roasting furnace 1 and is to be processed is first passed through a waste-heat boiler 2 and is cooled therein to 200°–400° C. Such waste-heat boilers are usually employed to generate steam 3.

The gas is subsequently cleaned in a dust-collecting dry-process electrostatic precipitator 4. For further purification the exhaust gas is fed to a scrubber 5 and is adiabatically cooled therein from the inlet temperature of 200°–400° C. to the dewpoint temperature of about 60°–80° C., depending on the concentration of the scrubbing acid, and absorbs about 200–400 g water per m³ (STP) at the same time.

The scrubbing acid flows from the scrubber 5 to a reservoir 6 and is recycled by a pump 7 to the top of the scrubber and sprayed into the same. Because the water content of the exhaust gas leaving the scrubber is excessive, the scrubber must be succeeded by a gas cooler 8, in which the exhaust gases are indirectly cooled with water 10. The cooling to about 40° C. results in a condensation of a large part of the water vapor so that the exhaust gas leaving the indirect gas cooler 8 contains only about 60 g water per m³ (STP).

The condensate 9 which becomes available in the gas cooler consists substantially of water with a small amount of $H_2SO_4$.

The gas is cleaned further in a wet-process electrostatic precipitator 11, from which the purified exhaust gas 12 is fed to the contact process plant for recovering sulfuric acid. A predetermined concentration of the scrubbing acid, e.g., 60% $H_2SO_4$, 40% $H_2O$ is maintained by a removal of scrubbing acid from the reservoir 6 and an addition of water thereto.

FIG. 2 shows an embodiment of the invention in which condensate formed in the cooler is sprayed in the latter. The exhaust gas enters the indirect gas cooler 15 at 13 and leaves it at 14. Cooling water is fed at 16 and withdrawn at 17. The difference from the plant shown in FIG. 1 resides in that a reservoir 18 for condensate, which has become available in the indirect gas cooler 15 and consists of water having a small $H_2SO_4$ content, and a pump 19 are associated with the indirect gas cooler 15. As a result, the exhaust gas can be sprayed via spray head SP with the condensate so that the local heat transfer to the cooling tubes is improved as has been described hereinbefore.

A further improvement can be obtained by the embodiment shown in FIG. 3. The exhaust gas is fed at 22 to a scrubber 21, as usual, and scrubbing acid from the reservoir 23 is fed by a pump 25 to the scrubber 21 and sprayed at the top thereof. An indirect gas cooler 24 (the tubes T of which can have internal fins) has an inlet 36a and an outlet 36b for the cooling water. In a further development of the operation of the indirect gas cooler shown in FIG. 2, the same is provided with spraying means which comprise a pump 26 for feeding scrubbing acid from the reservoir 23. The drained scrubbing acid returns to the reservoir which is associated with the scrubber 21 and the indirect gas cooler.

Through conduit 35, the reservoir 23 also receives the acid-containing condensate which becomes available as a result of the subsequent wet-process dust-collecting treatment (not shown in FIG. 3). Surplus scrubbing acid is withdrawn from the reservoir 23 through conduit 32 and water is fed to the reservoir 23 through conduit 33 in order to maintain a predetermined concentration of the scrubbing acid in the reservoir 23.

Because the exhaust gas stream is sprayed with scrubbing acid, the effectiveness of the indirect gas cooler 24 can be increased over that obtained in accordance with FIG. 1 so that the exhaust gas leaving the indirect gas cooler 24 contains even less water vapor than is required for the duct-collecting wet-process treatment. For this reason the water vapor content can be exactly controlled in an interposed saturator moistener 28 so that the exhaust gas leaving the saturator 28 at 29 can be exactly adjusted to the condition which is desired for the dust-collecting wet-process treatment, e.g., 40° C. and 60 g $H_2O/m^3$ (STP). Water is fed to the saturator by a pump 31 from a reservoir 30, which is fed with make-up water through a conduit 34. Line 35 represents return of condensate from the wet-process electrostatic precipitator to the reservoir.

The effectiveness of the indirect gas cooler 24 can be further improved in that a heat exchanger 27 for cooling the scrubbing acid is incorporated in the supply conduit for the scrubbing acid and said heat exchanger is supplied with coolant through conduit 37a and discharged at 37b.

SPECIFIC EXAMPLE

A roasting waste gas is recovered from the ore-roasting plant 1 and is passed through the waste heat boiler 2 producing steam and being cooled therein to a temperature of about 400° C. Dust is removed from the gas in the electrostatic precipitator 4 and the gas is fed to the scrubber 21 via the inlet 22 at a temperature of about 400° C. The sulfur acid content of the solution in the reservoir 23 is maintained at about 60% by weight $H_2SO_4$ and 40% $H_2O$. The scrubbing solution is recirculated to cool the gas, which at the inlet of the scrubber contains 35 g of $H_2O/m^3$ (STP), to a temperature of 96° C. at the outlet of the scrubber. The gas here contains 200 g $H_2O/m^3$ (STP).

The same scrubbing solution is recirculated through the indirect cooler 24 and, after cooling at 27, is sprayed into this indirect cooler. At the outlet of the cooler, the gas is at a temperature of 67° C. and contains 48 g $H_2O/m^3$ (STP).

In the remoistening or humidifier tower, in which water is circulated, the temperature of the gas is reduced to 40° C. and the water content increased to 60 g $H_2O/m^3$ (STP), the moisture content considered ideal for the final electrostatic precipitator stage 11. The gas leaving the wet-process electrostatic precipitator is fed at 12 to the contact process plant.

I claim:

1. A method of treating a sulfur-containing exhaust gas produced in a metallurgical roasting furnace for use in a contact-process plant for the production of sulfuric acid which comprises the steps of:
    (a) abstracting heat from said exhaust gas by indirect heat exchange and thereafter removing particulates from the gas;
    (b) scrubbing the gas from step (a) with an aqueous sulfuric acid solution;
    (c) passing the scrubbed gas of step (b) into and through an indirect gas cooler to reduce the moisture of the gas to not more than about 60 g $H_2O/m^3$ at 40° C. (STP) and to reduce the temperature of the gas;
    (c₁) spraying a sufficient amount of aqueous sulfuric acid into the gas while it is passing through the indirect gas cooler of step (c);
    (d) subjecting the indirectly cooled gas from step (c) to wet electrostatic precipitation; and
    (e) passing the gas subjected to the wet electrostatic precipitation of step (d) to a contact process plant for the production of sulfuric acid.

2. The method defined in claim 1, further comprising the steps of collecting scrubbed acid from step (b) in which it is concentrated by evaporation of water and aqueous sulfuric acid from the indirect cooler of step (c)

in which it is diluted by condensation of water in a common reservoir and recirculating the collected scrubbing acid from said reservoir to step (b) and step ($c_1$), respectively.

3. The method defined in claim 2, further comprising the step of:

recovering condensate from said wet-electrostatic precipitation in step (d) and feeding the recovered condensate to said reservoir.

4. The method defined in claim 3 further comprising the step of:

maintaining a constant concentration of sulfuric acid in said reservoir by withdrawing acid therefrom and feeding water to said reservoir.

5. The method defined in claim 4 wherein said concentration is 20 to 70%.

6. The method defined in claim 5 wherein said concentration is 45 to 65%.

7. The method defined in claim 1, further comprising the step of:

(f) moistening the gas from the indirect cooler of step (c) prior to introducing it into step (d) for wet-electrostatic precipitation.

8. The method defined in claim 7 further comprising the step of:

collecting water from the moistening of the gas in step (f) and recirculating the collected water to the moistening of further quantities of gas in step (f).

9. The process defined in claim 8 wherein the sulfur-containing exhaust gas further contains hydrogen halides, and further comprising the step of removing the hydrogen halides from the gas in the moistening water.

10. The method defined in claim 1 wherein the indirect cooler has vertical cooling tubes, said step (c) being carried out by spraying the aqueous sulfuric acid into the gas immediately above said cooling tubes and passing the sprayed aqueous sulfuric acid codirectionally with the gas through said tubes.

11. The method defined in claim 10 wherein said tubes have internal cooling fins, step (c) further comprising:

externally cooling said tubes by passing a cooling fluid therealong in counterflow to the gas traversing the tubes.

12. The method defined in claim 1 further comprising the step of:

cooling said aqueous sulfuric acid by indirect heat exchange with water prior to spraying it into said gas in said indirect cooler in step ($c_1$).

13. An apparatus for the treatment of a sulfuric-acid-containing gas produced in a roasting furnace for use in a contact-process production of sulfuric acid, said apparatus comprising:

(a) a waste-heat boiler connected to said furnace for abstracting heat from said gas;

(b) a dry-process electrostatic precipitator connected to said waste-heat boiler;

(c) a scrubbing tower connected to said dry-process electrostatic precipitator and provided with a reservoir containing aqueous sulfuric acid and means for recirculating said aqueous sulfuric acid between said scrubbing tower and said reservoir;

(d) an indirect cooler connected to said scrubbing tower for indirectly cooling the scrubbed gas therefrom, said indirect cooler comprising:

($d_1$) an upright tower, ($d_2$) vertically extending tubes in said tower and communicating with a gas space above said tubes, ($d_3$) means for passing water into contact with external surfaces of said tubes, and ($d_4$) means for spraying aqueous sulfuric acid into the space in ($d_2$) for improving the heat exchange between the gas and said tubes in ($d_2$) and for drying the gas;

(e) a wet-process electrostatic precipitator downstream of said indirect cooler and in flow communication therewith;

(f) means for collecting aqueous sulfuric acid from said indirect cooler and feeding the collected aqueous sulfuric acid to said reservoir; and (g) means for feeding aqueous sulfuric acid from said reservoir to said spraying means ($d_4$).

14. The apparatus defined in claim 13 further comprising:

($f_1$) means for removing sulfuric acid from said reservoir, and ($f_2$) means for adding water to said reservoir to maintain the sulfuric acid concentration therein constant.

15. The apparatus defined in claim 13, further comprising:

(g) a moistening tower between said indirect cooler and said wet-process electrostatic precipitator and in flow communication therewith for conditioning the gas fed to the latter, said moistening tower including means for collecting water from the moistening tower and recirculating the collected water to the moistening tower.

* * * * *